United States Patent [19]

Logan

[11] 4,255,889

[45] Mar. 17, 1981

[54] CHANGEABLE DISPLAY

[75] Inventor: Corrigan D. Logan, Tuscaloosa, Ala.

[73] Assignee: Roll-A-Vision, Inc., Tuscaloosa, Ala.

[21] Appl. No.: 855,786

[22] Filed: Nov. 28, 1977

[51] Int. Cl.[3] .................................. C09F 11/18

[52] U.S. Cl. .................................................. 40/518

[58] Field of Search ................. 40/518, 471, 529, 385, 40/518

[56] References Cited

U.S. PATENT DOCUMENTS

| | | | |
|---|---|---|---|
| 797,097 | 8/1905 | Chapman | 40/471 |
| 1,024,955 | 4/1912 | Thomsen | 40/467 |
| 1,065,337 | 6/1913 | Borroughs | 40/518 X |
| 1,076,222 | 10/1913 | Moscovitz | 40/471 X |
| 1,578,039 | 3/1926 | Kelly | 40/471 |
| 1,768,409 | 6/1930 | Kuczorra | 40/467 |
| 1,918,298 | 7/1933 | Taylor | 40/471 X |
| 2,328,055 | 8/1943 | Clough | 40/471 X |
| 2,517,414 | 4/1950 | Pratt et al. | 40/518 X |
| 2,935,806 | 5/1960 | Young | 40/471 X |
| 3,065,907 | 11/1962 | Thomas | 40/518 X |
| 3,255,541 | 6/1966 | Bettcher | 40/518 X |
| 3,364,604 | 1/1968 | Donaldson et al. | 40/471 |
| 3,510,973 | 5/1970 | Mazzocco | 40/471 |
| 3,616,554 | 11/1971 | Singer et al. | 40/471 |
| 3,726,031 | 4/1973 | Singer | 40/471 |

FOREIGN PATENT DOCUMENTS

| | | | |
|---|---|---|---|
| 1117371 | 11/1961 | Fed. Rep. of Germany | 40/518 |
| 445189 | 11/1912 | France | 40/518 |
| 24111 | of 1907 | United Kingdom | 40/518 |

*Primary Examiner*—Louis G. Mancene

*Assistant Examiner*—Wenceslao J. Contreras

*Attorney, Agent, or Firm*—Lowe, King, Price and Becker

[57] ABSTRACT

A changeable display includes a sheet containing a number of joined frames, each having a display on opposite sides. The sheet is wound on a pair of take-up rollers having parallel axes separated by one frame. A separate idler roller for each take-up roller is arranged so a nip is formed between each idler roller and its associated take-up roller. A motor-clutch arrangement selectively drives one of the take-up roller to transfer the sheet between the take-up rollers. Each idler roller is urged toward the periphery of the wound material on its associated take-up roller while the sheet is being transferred between the take-up rollers to maintain a constant separation nip between each idler roller and the periphery of the sheet on each take-up roller. A housing for the sheet, rollers and motor-clutch pair of includes a pair of windows on opposite sides of the sheet. The windows lie parallel and in close proximity with the sheet so light is not substantially reflected between the windows and the sheet and are mounted on pivoting panels. A bumper pad on one window urges against one side of the sheet when the panels are closed. The housing includes light diffusing, translucent surfaces through which light from lamps inside of the housing that simultaneously illuminate the opposite sides of the sheet propagates. The frames are secured together by a wire extending beyond an edge of the sheet of the last frame at each sheet end. The extending wire portion activates a microswitch to prevent winding the sheet off the take-up rollers.

20 Claims, 8 Drawing Figures

11
17
18
13
21
22
19
24
23
27
29
28
29

15
16
14
111
26
19'
26
13
32
31
11
115
19
27
29
29
28
28
112
25

FIG. 4
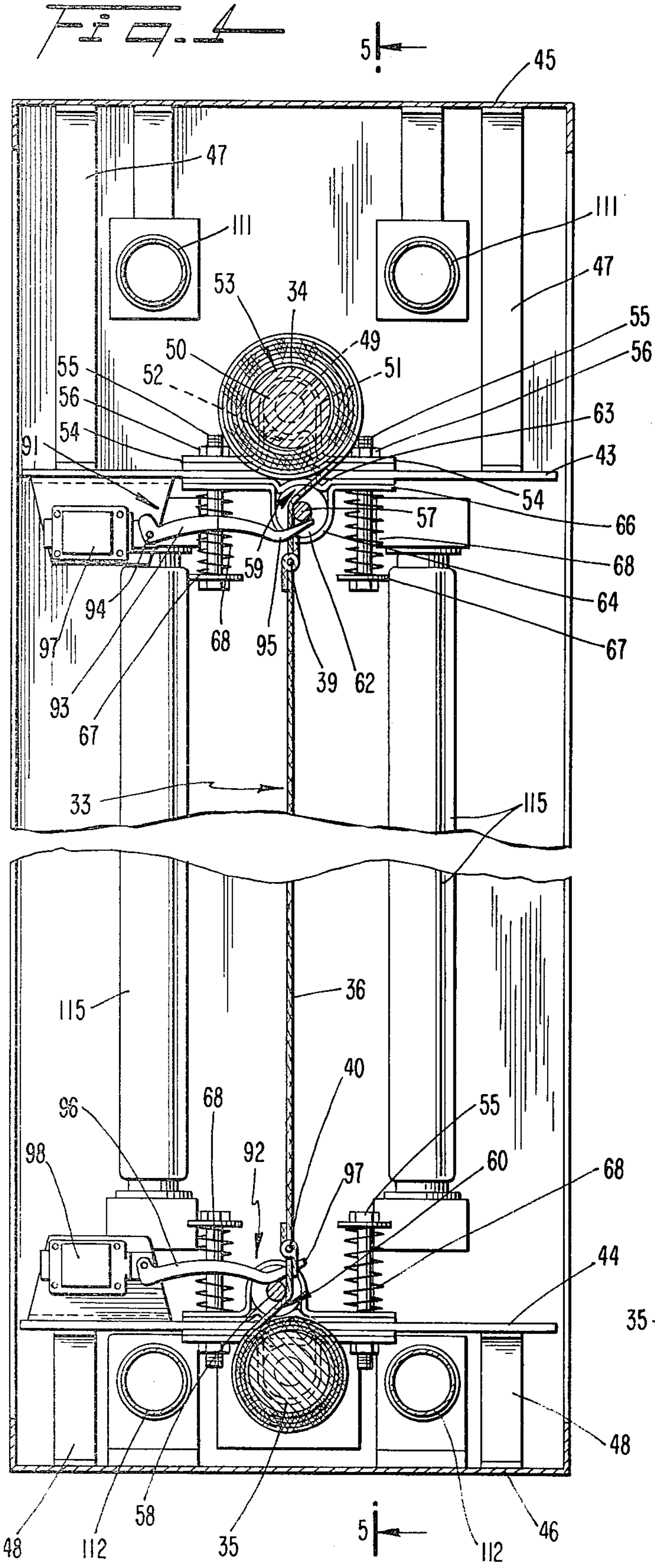
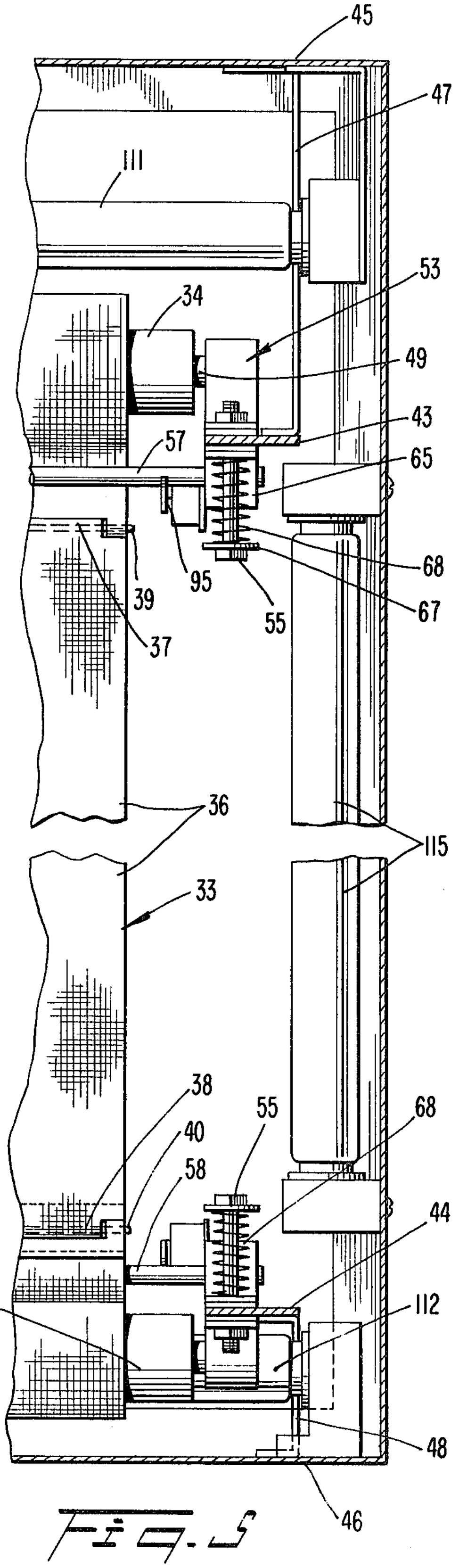
FIG. 5

CHANGEABLE DISPLAY

FIELD OF THE INVENTION

The present invention relates generally to changeable displays, and more particularly to a changeable display wherein a sheet is wound between a pair of take-up rollers having parallel axes.

BACKGROUND OF THE INVENTION

Numerous changeable displays wherein a sheet is wound between a pair of take-up rollers having parallel axes have been developed. Such displays are commonly employed in transit vehicles and have been proposed for large advertising displays. Despite the obvious advantages of employing such changeable displays for large advertising signs, to my knowledge, no such signs have been commercially used.

In fabricating a large advertising sign employing conventional structure, as is employed in vehicular displays, I found that there was a significant amount of skewing of the sheet between the rollers. The skewing caused the sheet to wrinkle as it was wound about the take-up rollers, and also caused the sheet to twist as it was being wound on the take-up rollers. In analyzing the problem, I realized that the sheet was not being maintained taut between the take-up rollers. Providing an idler roller in association with each take-up roller did not substantially reduce the slack in the sheet. The problem of slack can be appreciated when it is considered that a display frame typically is defined by a rectangle having a height of approximately 3.5 feet between the take-up rollers and a length of approximately 7.5 feet.

It is, accordingly, an object of the present invention to provide a new and improved large, changeable display of the type wherein a sheet is wound on a pair of parallel rollers.

Another object of the invention is to provide a new and improved sheet winding apparatus wherein wrinkling and twisting of a sheet being wound on a take-up roller is substantially eliminated.

A further object of the invention is to provide a new and improved large, changeable advertising display wherein a sheet is wound between a pair of take-up rollers and slack in the sheet between the rollers is substantially eliminated so that the sheet does not have a tendency to wrinkle or twist as it is wound on a take-up roller.

BRIEF DESCRIPTION OF THE INVENTION

In accordance with one aspect of the invention, wrinkling and twisting of a sheet as it is being wound on a take-up roller are substantially prevented by providing an elongated member, in the form of an idler roller, that extends parallel to the axis of the take-up roller so that a nip is formed between the elongated member and the take-up roller. The elongated member is urged toward the periphery of the sheet material wound on the roller while the sheet is being transferred to and from the take-up roller so that a nip having a constant separation between the adjacent periphery of the sheet wound on the take-up roller and the elongated member is maintained regardless of the radius of the material on the take-up roller. By maintaining a nip of constant separation between the periphery of the sheet on the take-up roller and the elongated member, constant tension is maintained on the sheet to prevent skewing thereof and thereby prevent wrinkling and twisting of the sheet as it is wound on the take-up roller.

This sheet winding mechanism is employed in connection with a changeable display in the form of multiple frames that together form the sheet. The frames form elements of the display between a pair of take-up rollers having parallel axes separated by a distance slightly in excess of one of the frames. A separate idler roller is provided for each of the take-up rollers and the nips formed between the idler rollers and the periphery of the sheet on the take-up rollers are maintained constant by a spring biasing arrangement. In particular, the idler rollers are mounted so that they effectively float with respect to the fixed take-up rollers. As the radius of the sheet material on the rollers changes, a fixed distance between the idler roller and the sheet periphery on the take-up rollers is maintained.

In accordance with a further aspect of the invention, each sheet frame has a display on its opposite sides, and these opposite sides may be viewed simultaneously from opposite sides of a housing for the display through transparent windows on side panels of the housing. Lamps inside of the housing simultaneously illuminate the opposite sides of the display that are located behind the transparent windows or regions. The lamps are located behind light diffusing, translucent surfaces through which light from the lamps propagates to illuminate the panels. The light diffusing, translucent surfaces, however, prevent images of the lamps from being seen outside of the housing so that viewers looking at opposite sides of the housing see the displayed frames with constant illumination and virtually no shadows.

To minimize reflections between the display frames and the windows, from either external or internal light sources, so that viewers see the displayed frames clearly, the transparent windows lie parallel to and in close proximity with the displayed frames. To enable the light from the lamps inside of the housing to be projected onto the displayed frames, the windows are centrally located relative to opposite, outer faces of the housing and the translucent surfaces taper inwardly from each of the housing faces to the windows. The transparent windows are mounted on housing panels, at least one of which is pivotable about an axis remote from the windows so that the windows of at least one of the panels can be moved away from the displayed frame and access to the interior of the housing can be had when maintenance is necessary. One of the housing panels includes bumper pads that contact the sheet while the panels are closed to assure that the sheet remains in situ while neither of the take-up rollers is being driven. The bumper pads prevent the windows from simultaneously contacting the opposite sides of the sheet so that the sheet is not damaged.

A further feature of the invention is that a rod-like means, such as a piano wire, secures together adjacent frames of the sheet, each of which forms an individual element of the display. A portion of the rod-like means may extend beyond an edge of the sheet so that as the sheet is transferred between the take-up rollers, the extending portion traverses a sensing zone. In response to the extending portion being in the sensing zone, activation of the driving means for the take-up rollers is controlled.

In a particular application, a rod extends beyond the edges of only the last frames that form elements of the display at opposite ends of the sheet. Each of these rods engages a microswitch in the sensing zone. When the microswitch is engaged, the motor driving the sheet is deactivated to prevent the sheet from being driven past the last panel. This prevents the sheet from being driven off of the take-up roller, and avoids an obvious deleterious situation.

It is, accordingly, an additional object of the invention to provide a new and improved, large, changeable display that can be simultaneously viewed from opposite sides of a housing for the display.

Another object of the invention is to provide a new and improved relatively large, advertising type changeable display wherein a sheet is driven between a pair of take-up rollers and the sheet includes displayed frames on opposite sides thereof, which frames can be simultaneously viewed from opposite sides of a housing.

A further object of the invention is to provide a new and improved changeable display that can be viewed from opposite sides and which includes internal lighting so that the display can be easily seen at night, with constant illumination.

A further object of the invention is to provide a new and improved, large, changeable display wherein a sheet is driven between a pair of spaced, parallel take-up rollers behind a pair of windows which are mounted on housing panels, one of which is easily swung out of the way so that access can be had to the sheet for maintenance purposes.

Yet another object of the invention is to provide a new and improved changeable display wherein a sheet is wound on a pair of spaced take-up rollers having parallel axes, and wherein individual frames of the display are secured together by a mechanism which also activates a controller for a drive for the take-up rollers.

Yet another object of the invention is to provide a new and improved device for preventing a sheet from being driven off of a take-up roller on which it is wound.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 4 is a sectional view, taken through the lines 4—4 of FIG. 3;

FIG. 5 is a sectional view taken through the lines 5—5 of FIG. 4;

DETAILED DESCRIPTION OF THE DETAILED EMBODIMENT

Figure 1:
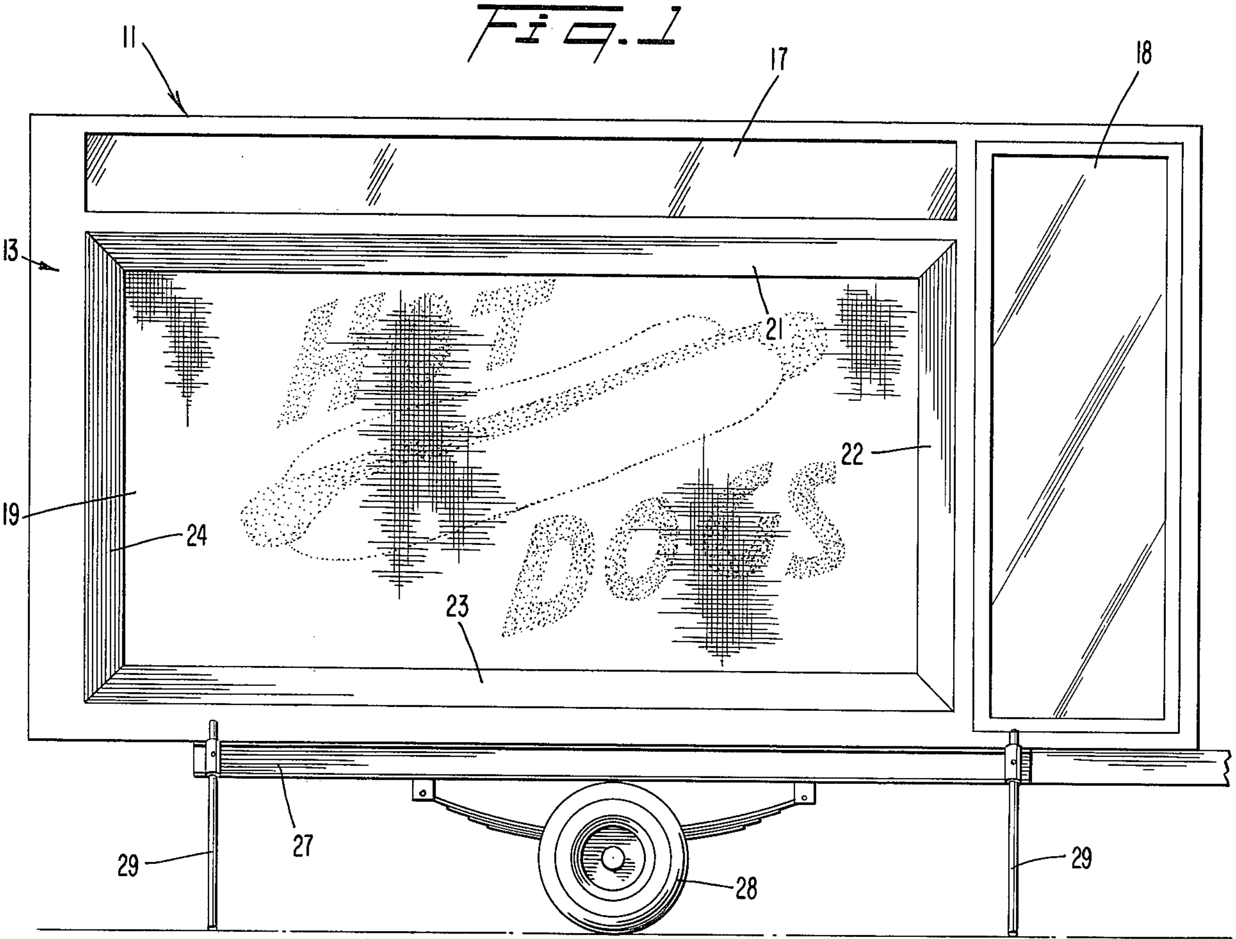
FIGS. 1 and 2 are plan and side views of a changeable display in accordance with the invention.

Reference is now made to FIG. 1 wherein sign housing 11 includes a pair of side panels 13 and 14, respectively pivotable about shafts 15 and 16, mounted at the top of the housing. Panels 13 and 14 are pivoted about shafts 15 and 16 to enable access to be had to the interior of housing 11 for maintenance purposes and the like. Mounted within housing 11 are changeable and fixed displays and lamps for illuminating these displays, as described infra. Panels 13 and 14 are substantially identical to each other, except as described infra; therefore, a description of panel 13 generally suffices for both panels.

Extending across most of the top, and along the right side of panel 13 are separate fixed displays 17 and 18, both of which are essentially windows having indicia painted thereon. Typically, the indicia is advertising material back-lighted by lamps inside of housing 11. The major portion of panel 13 is occupied by a transparent, rectangular plexiglass window 19, immediately below and to the left of displays 17 and 18. Behind window 19 is a frame 36 (FIG. 3) of a changeable display sheet 33. Each of the frames has approximately the same area as window 19 and different frames appear at different times behind the window.

Window 19 is framed by four translucent, flat sheets 21–24 that taper outwardly from the window toward the face of panel 13 on which displays 17 and 18 are located. Sheets 21–24 are translucent, i.e., semitransparent, to enable light from lamps positioned behind panel 13 to illuminate the displayed frame positioned behind window 19, without enabling a viewer of the displayed frame to see the outline of the lamps. Window 19, in combination with sheets 21–24, forms a concave type structure having flat, translucent sides and a flat, inner, transparent region.

Each frame of display sheet 33 includes indicia bearing frames on opposite sides thereof, so that different viewers of the sign in housing 11 can simultaneously view the opposite sides. Sheet 33 passes through a relatively narrow slit 25 between parallel windows 19 and 19' of panels 13 and 14, respectively. Transparent, resilient pads 26 are mounted at the four corners of window 19' to prevent direct contact between windows 19 and 19' when panels 13 and 14 are swung into the normal, vertical position thereof, thereby preventing possible breakage to the transparent windows and damage to sheet 33. Pads 26 bear against the frame of sheet 33 behind window 19 when panels 13 and 14 are in the normal position thereof. The narrow gap 25 between windows 19 and 19' assists in preventing internal reflection and refraction of light from the lamps, as well as external lighting, so that the displayed frames behind the windows are clearly seen without shadows and glare resulting from internal reflections between the displayed frames and the windows.

Housing 11 is mounted on an open frame 27, which in turn is carried by a pair of wheels 28 so that the entire display can be easily towed from one place to another. For stability purposes, vertically extending struts 29 are provided in proximity to the four corners of open frame 27.

Mounted on a side wall of housing 11 is a control panel 31, located behind door 32 that can be locked in place by a suitable latch and key. As described infra, control panel 31 includes switches for starting and stopping a motor that drives sheet 33, as well as for controlling whether the sheet is driven upwardly or downwardly.

Figure 3:
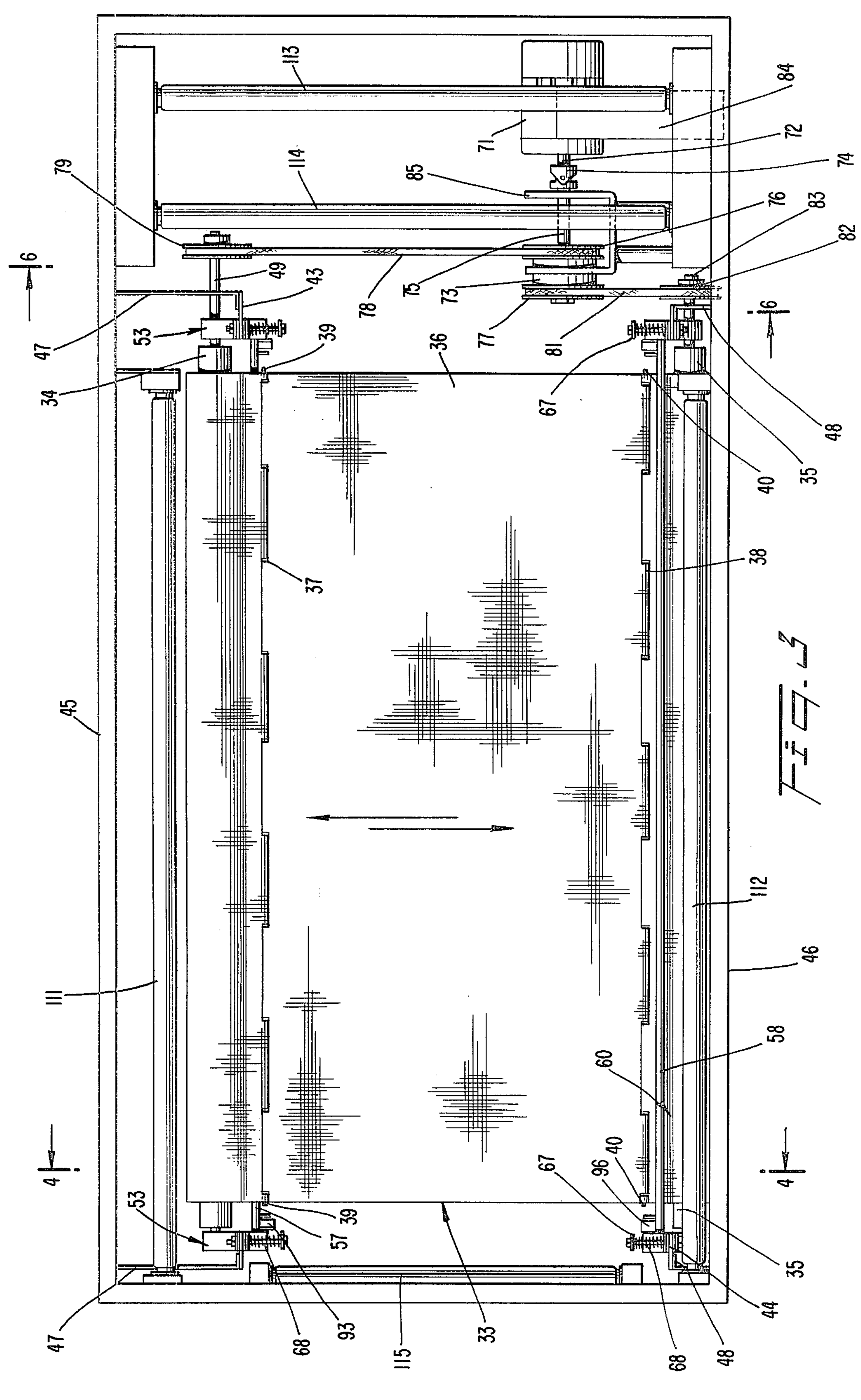
FIG. 3 is a plan view of the display of FIGS. 1 and 2, with one of the side housing panels removed.

As illustrated in FIGS. 3–5, displayed frames 36 are part of a sheet 33 which extends between and is rolled on horizontally extending take-up rollers 34 and 35, respectively mounted in proximity to the upper and lower edges of housing 11, as well as above and below the upper and lower edges of window 19 so that they are not visible to a viewer. Each frame, such as frame 36, of sheet 33 has an area slightly greater than the area of window 19 and is formed as an individual element because of its size, approximately 3.5′×7.5′ in a preferred embodiment. Because each of the frames is substantially identical, a description of frame 36 suffices for all of the remaining frames.

Frame 36 includes relatively small diameter sleeves 37 and 38, respectively, along the upper and lower edges of the frame. Sleeves 37 and 38 are interdigitated with corresponding sleeves of adjacent frames of sheet 33 above and below frame 36. The adjacent frames are secured together by a pair of rod-like, piano wires 39 and 40 that extend through the interdigitated sleeves along the upper and lower edges of frame 36. Generally, piano wires 39 and 40 have a length only slightly in excess of the width of each frame. However, the piano wire for the last display frames at opposite ends of sheet 33 include an extending segment 41 beyond both edges of sheet 33 to prevent the sheet from being driven off of rollers 34 and 35.

Drive rollers 34 and 35 are fixedly mounted in housing 11 by being secured to horizontally extending brackets 43 and 44, fixedly connected to top and bottom faces 45 and 46 of housing 11 by fixed supporting struts 47 and 48, respectively. Take-up roller 34 is mounted on shaft 49, carried by bearing 50. Bearing 50 is secured in place between arcuate upper and lower segments 51 and 52 of bearing housing 53. Extending horizontally from upper and lower segments 51 and 52 are flanges 54, having holes through which bolts 55 project. Bolts 55 are secured against flanges 54 by suitable washers and nuts 56. Bolts 55 extend through holes in frame 43 which are aligned with the holes in flanges 54.

Take-up rollers 34 and 35 respectively cooperate with idler rollers 57 and 58 to form nips 59 and 60 just beyond the upper and lower edges of displayed frame 36. Idler rollers 57 and 58 in effect float relative to take-up rollers 34 and 35 so that a nip having a constant vertical gap is formed between each idler roller and the proximate periphery of the sheet on its associated take-up roller regardless of the radius of the material or sheet on the take-up rollers. By maintaining a constant separation between the periphery of the sheet on each take-up roller and its adjacent idler roller, constant tension is maintained on sheet 33 to prevent skewing, wrinkling and twisting of the sheet as it is wound on take-up roller 34 from take-up roller 35, or vice versa.

To these ends, idler roller 57 is urged toward take-up roller 34 by a spring arrangement that cooperates with the idler roller mounting. In particular, idler roller 57 is carried by bearing 62 which fits between arcuate upper and lower housing segments 63 and 64 of bearing housing 65. Extending horizontally from segments 63 and 64 are flanges 66, having bores that are aligned with each other and the apertures or bores of flanges 54. Flanges 66 extend along the bottom face of frame 43, opposite from the face of the frame along which flanges 54 extend. Bolts 55 extend through the bores of flanges 66. Bolts 55 are provided with shoulders 67 at the ends of the bolts remote from nuts 56. In the region between the lower faces of flanges 66 and the upper flanges of shoulders 67, tension springs 68 are mounted in coaxial relationship with bolts 55. The force of spring 68 is such that a nip of constant gap is maintained between the upper periphery of idler roller 57 and the lower periphery of sheet 33 as it is being wound on take-up roller 34, regardless of the diameter of the sheet material wound on take-up roller 34.

A similar, but diametrically opposite arrangement is provided for mounting take-up roller 35 and idler roller 58 so that a constant gap nip is maintained between the bottom of the idler roller and the upper periphery of the sheet being wound on take-up roller 35. For this reason, no detailed description of the mounting and spring arrangement for rollers 35 and 58 is provided. However, it is to be noted that the sheet material is wound between top take-up roller 34 and top idler roller 57 in an opposite direction from bottom take-up roller 35 and bottom idler roller 58; in the configuration illustrated in FIG. 4, sheet 33 extends to the right between the upper idler and take-up rollers while the sheet extends to the left between the lower take-up and idler rollers.

Figure 2:
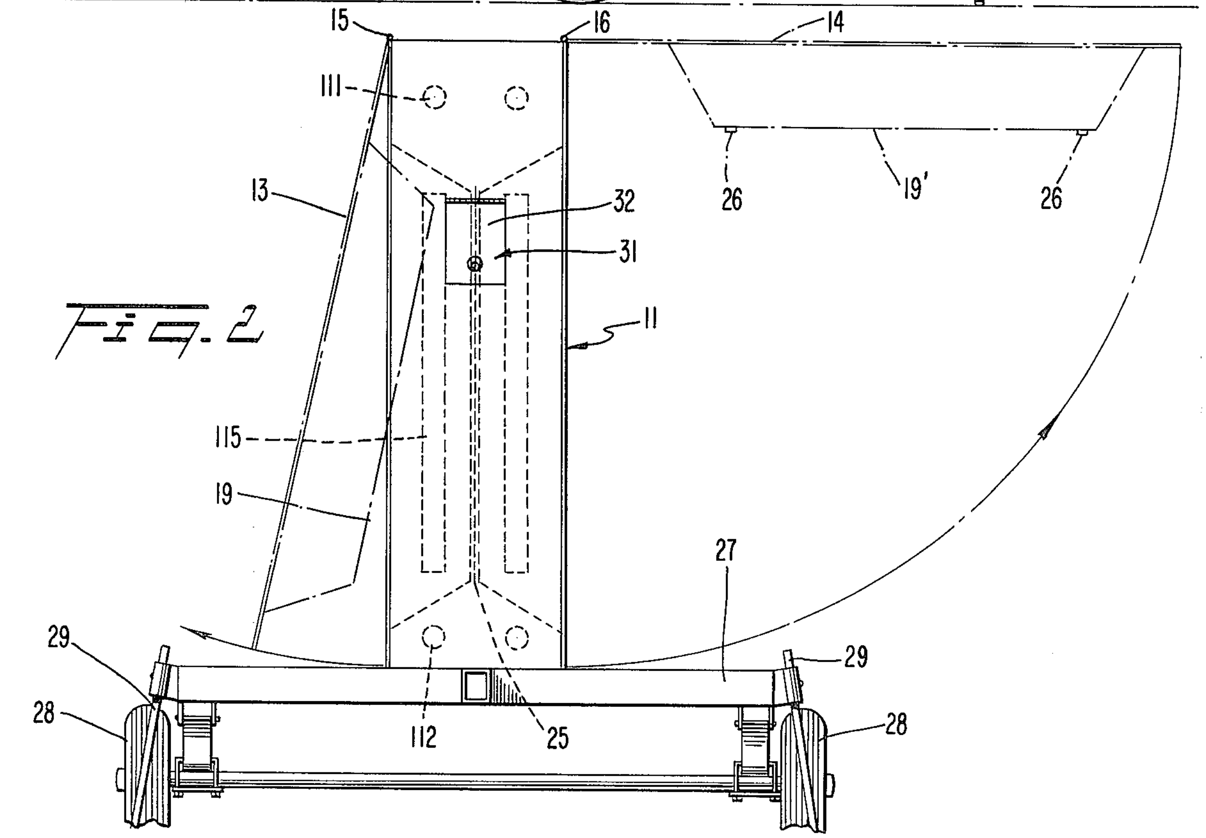

Sheet 33 is selectively driven between take-up rollers 34 and 35 by AC motor 71, having an output shaft 72 that drives clutch 73 through coupling 74 and shaft 75. Clutch 73 includes a pair of output pulleys 76 and 77, one of which is selectively driven by shaft 75, depending upon the manner in which clutch 73 is activated in response to an electric control included in panel 31, FIG. 2.

Pulley 76 drives upper take-up roller 34 by being connected to belt 78. Belt 78 is about pulley 79 that is splined to shaft 49, in turn drivingly connected to take-up roller 34. Pulley 77 drives take-up roller 35 through belt 81, wound on pulley 82. Pulley 82 is splined to shaft 83 which is drivingly connected to take-up roller 35. Motor 71 and clutch 73 are respectively fixedly mounted to the base of housing 11 by connections through brackets 84 and 85. To drive sheet 33 upwardly so it is paid from take-up roller 35 to take-up roller 34, clutch 73 is electrically activated by a switching means (described infra) so that pulley 76 is drivingly connected to shaft 72 while pulley 77 is disengaged from shaft 72. Thereby, belt 78 drives pulley 79 which in turn drives shaft 49 and take-up roller 34. Take-up roller 35 is at this time free to rotate without substantial drag so that sheet 33 is drawn from roller 35 to roller 34 in response to the latter being turned by the motor, clutch, pulley arrangement.

Motor 71 and clutch 73 are activated in response to manual depressions of a start switch for the motor and a switch which causes pulley 76 to be drivingly connected to shaft 75 so that one frame 36 of sheet 33 may traverse past window 19. After there has been a one frame transfer of sheet 33 past window 19, the switches which control motor 71 and clutch 73 and manually deactivated. Generally, a particular frame of sheet 33 stays behind window 19 for a relatively long time interval, such as a day or a week. After the expiration of such an interval, the motor and clutch switches are again activated and a different frame is advanced to the region behind window 19. To drive sheet 33 from take-up roller 34 to take-up roller 35, the switch for motor 71 is again activated, but a different switch for clutch 73 is activated, whereby pulley 77 is driven by shaft 72, to the exclusion of pulley 76. While manual operation of the switches for motor 71 and clutch 73 has been found satisfactory, control of these switches can be automatic, similar to a manner described infra in connection with automatic stopping of sheet 33 at the opposite ends of the sheet.

Figure 7:
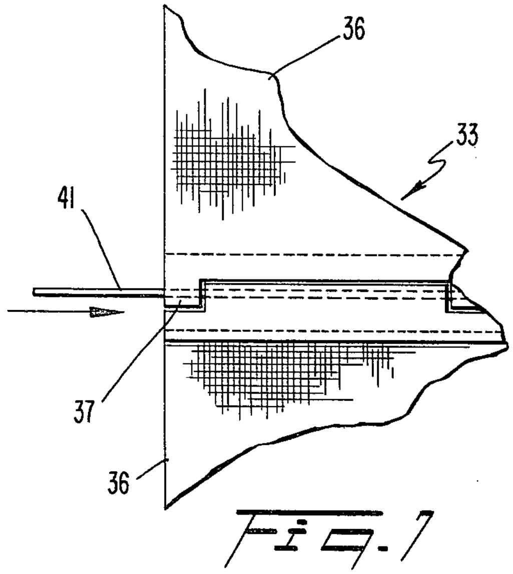
FIG. 7 is an enlarged view of a piano wire securing adjacent sheet frames together and extending beyond an edge of the sheet.

To automatically control the drive of sheet 33, and in particular, to prevent the sheet from being driven past the last display frames, at opposite ends of the sheet, sensing zones 91 and 92 are provided for the extending portion 41 (FIG. 7) of the piano wires connecting the last frames to leaders secured to rollers 34 and 36. Sensing zones 91 and 92 are adjacent nips 59 and 60, as well as the top and bottom take-up rollers 34 and 35. Sensing zones 91 and 92 are located adjacent the opposite edges of sheet 33, to sense portions of the piano wire that extend from opposite edges of the sheet. Because sensing zones 91 and 92 are generally identical, a description of sensing zone 91 is believed to suffice for both.

Sensing zone 91 is basically a microswitch including an armature 93 that pivots about horizontally extending stud 94. The free end of armature 93 includes an upwardly extending finger 95 for engaging extending portion 41 as the extending portion moves upwardly into a region immediately below idler roller 47. Sensing zone 92 includes a similar microswitch armature 96 having an upwardly extending finger 97 for sensing when the extending portion adjacent the opposite edge of sheet 33 moves into a region immediately above idler roller 58. In response to counterclockwise and clockwise rotation of armatures 94 and 96 about their respective studs, normally closed contacts in microswitch housings 97 and 98 of sensing zones 91 and 92 are open circuited in response to rotation of shoulders 88 and 89 about the studs of armatures 93 and 96 to deactivate motor 71, whereby the driven take-up roller is stopped and sheet 33 cannot go beyond its last frame containing displayed information.

Figure 8:
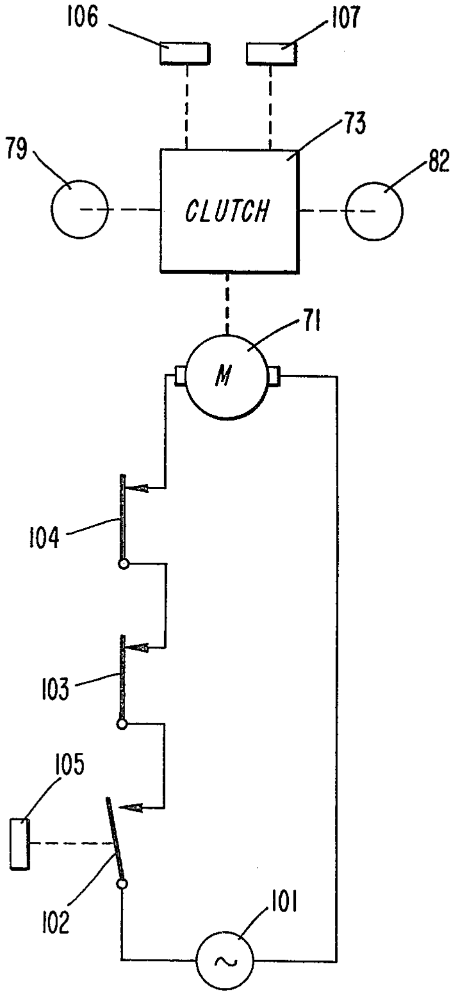
FIG. 8 is a circuit diagram of the electrical controller in accordance with the invention.
Figure 6:
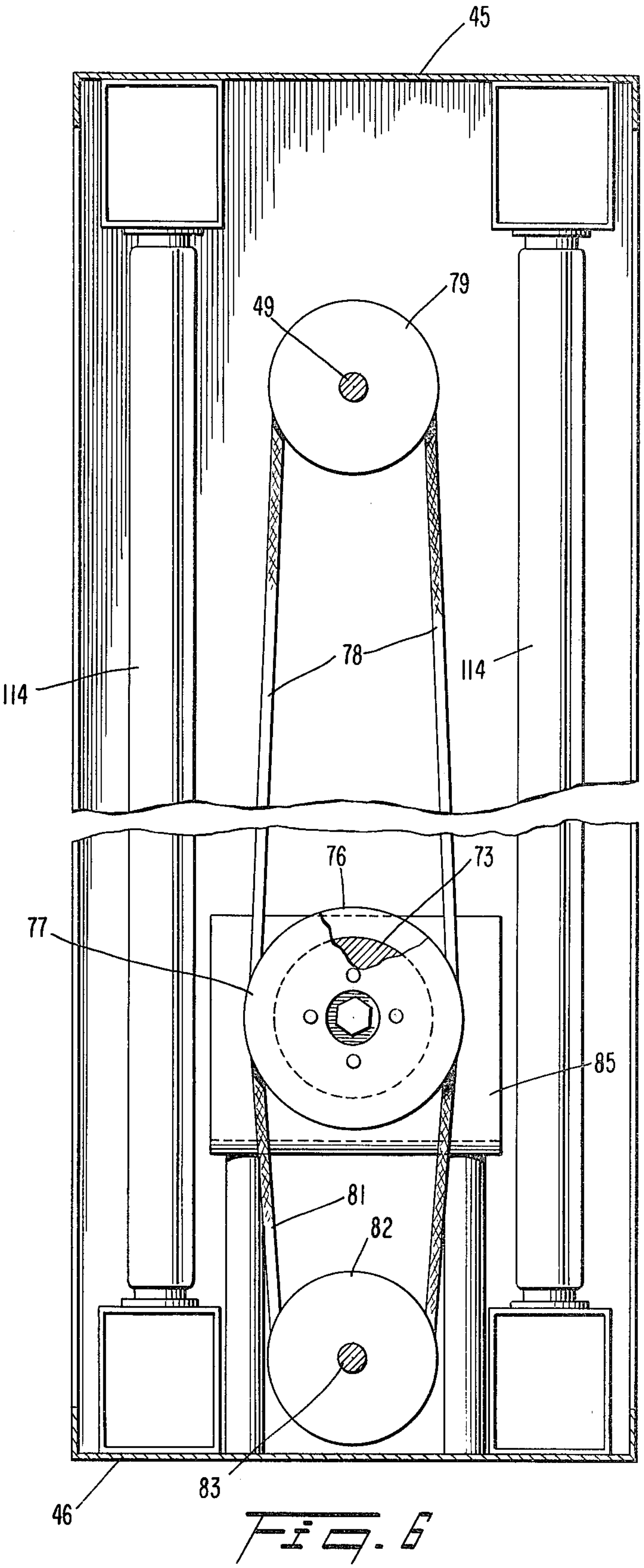
FIG. 6 is a sectional view taken through the lines 6—6 of FIG. 3.

Reference is now made to FIG. 8 of the drawing wherein an electrical schematic diagram is illustrated for motor 71 and clutch 73. Motor 71 is selectively connected to a suitable AC source 101 by normally open circuited contacts of manually activated, spring biased start switch 102 that is series connected with normally closed contacts 103 and 104 included in microswitch housings 97 and 98 of sensing zones 91 and 92, respectively. Switch 102 is contained in panel 31 (FIG. 2), and is of the type whereby the switch contacts remain locked in the closed position, once the switch control button 105 is depressed. The contacts of switch 102 are open circuited when the switch control button 105 is depressed a second time. In response to button 105 causing the contacts of switch 102 to be closed, power is upplied by AC source 101 to motor 71 through switches 102–104, whereby the motor is driven in a predetermined direction. Motor 71 remains activated until switch 102 is opened by a second manual depression of button 105, or in response to contacts 103 or 104 being open circuited when extending segments 41 pass through either of the sensing zones 91 or 92.

Clutch 73 includes a pair of electrical switch contacts responsive to push buttons 106 and 107, contained in panel 31. Buttons 106 and 107 are arranged with the switches in clutch 73 in the same manner as button 105 is arranged with contact 102; i.e., in response to button 106 or 107 being initially depressed, the corresponding switch contacts of clutch 73 are closed and remain closed until the button is depressed a second time. In response to the contacts associated with button 106 being closed, motor 71 drives clutch 73 and pulley 79 so that take-up roller 34 is driven, while closure of the contacts associated with button 107 results in pulley 82 and take-up roller 35 being driven by motor 71.

To illuminate panel 36 of sheet 33 behind window 19, as well as to illuminate the fixed displays 17 and 18 above and to the side of displayed panel 36, fluorescent lamp tubes are strategically positioned within housing 11, so that none of the lamps are in the direct line of sight of a viewer. Two identical sets of fluorescent lamps are provided, one set being for fixed displays 17 and 18 on panel 13 and the movable panel 36 behind window 19, and another set for the fixed displays on panel 14 and the movable display behind window 19'. Therefore, only a description of the lamps for illuminating the displays associated with panel 13 is provided.

All of the lamps for illuminating the displays associated with panel 13 are positioned between the plane containing slot 25 and the face of panel 13. A pair of horizontally extending fluorescent lamps 111 and 112 are respectively positioned above and below take-up rollers 34 and 35. Lamps 113 and 114 vertically extend behind window 18, to the right of window 19 (as illustrated in FIG. 1), while lamp 115 extends vertically to the left of window 19. All of lamps 111–115 are positioned in approximately the same plane, sufficiently forward of take-up rollers 34 and 35 so that there is essentially an unobstructed path for light propagating from the lamps to translucent sheets 21–24. The light from lamps 111–115 passes through and is diffused by sheets 21–24 to provide uniform illumination for the displayed frame 36 viewed through window 19. In addition, lamps 111, 113 and 114 provide direct back lighting for fixed displays 17 and 18.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A changeable display in the form of multiple frames together forming a sheet, comprising a pair of take-up rollers on which the sheet is adapted to be wound, said take-up rollers having parallel axes separated by the distance of at least one of the frames, means for driving at least one of the take-up rollers, a separate idler roller for each of said take-up rollers, each of said idler rollers having an axis parallel to the axis of its associated take-up roller so that a nip is formed between each idler roller and its associated take-up roller, said sheet being transferred between the take-up rollers so that the radius of the material wound on said take-up rollers is variable, and means for urging each of the idler rollers toward the periphery of the wound material on its associated take-up roller while the sheet is being transferred between the take-up rollers to maintain a nip having a constant separation between each idler roller and the adjacent periphery of the sheet wound on its associated take-up roller regardless of the radius of the material on the take-up rollers.

2. The display of claim 1 wherein the axis of each of the take-up rollers is relatively fixed and each of said idler rollers is mounted to float relative to the axis of its associated take-up roller, and said urging means for each of the idler rollers includes spring means for biasing the floating idler roller toward the periphery of the wound material on its associated take-up roller.

3. The display of claim 2 wherein the spring means includes a separate tension spring adjacent opposite ends of each idler roller beyond edges of the sheet.

4. The display of claim 1 wherein each frame has a display on opposite sides thereof, a housing in which the sheet, take-up rollers, idler rollers, driving means and urging means are located, opposite sides of said housing having transparent regions behind which the sheet is located so that the opposite sides of the same frame can be simultaneously viewed from the opposite sides of the housing, and lamp means inside of the housing for simultaneously illuminating the opposite sides of the frame that are located behind the transparent regions.

5. The display of claim 4 wherein the housing includes light diffusing, translucent surfaces through which light from the lamp propagates to illuminate the panels and which prevent images of the lamps from being seen outside of the housing.

6. The display of claim 5 wherein the transparent regions are centrally located relative to opposite faces of the housing so that a gap is formed between the transparent regions, said sheet passing through the gap between the take-up rollers, and wherein the surfaces are tapered inwardly toward the gap and away from each outside face of the housing.

7. A sheet winding apparatus comprising a take-up roller on which the sheet is adapted to be wound, said sheet being transferred to and from the roller so that the radius of the material wound on the roller is variable, an elongated member extending parallel to the axis of the roller so that a nip is formed between the member and the take-up roller, and means for urging the elongated member toward the periphery of the wound material while the sheet is being transferred to and from the take-up roller to maintain a nip having a constant separation between the adjacent periphery of the sheet wound on the take-up roller and the elongated member, regardless of the radius of the material on the take-up roller.

8. The apparatus of claim 7 wherein the axis of the take-up roller is relatively fixed and said elongated member is mounted to float relative to the axis of said take-up roller, and said urging means includes spring means for biasing the floating elongated member toward the periphery of the wound material.

9. A changeable display in the form of multiple frames together forming a sheet, comprising a pair of take-up rollers on which the sheet is adapted to be wound, said take-up rollers having parallel axes separated by the distance of at least one of the frames, means for driving one of the take-up rollers, an idler roller for one of the take-up rollers, said idler roller having an axis parallel to the axis of its associated take-up roller so that a nip is formed between the idler roller and its associated take-up roller, said sheet being transferred between the take-up rollers so that the radius of the material wound on said take-up rollers is variable, and means for urging the idler roller toward the periphery of the wound material on its associated take-up roller while the sheet is being transferred between the take-up rollers to maintain a nip having a constant separation between the idler roller and the adjacent periphery of the sheet wound on its associated take-up roller, regardless of the radius of the material on the take-up rollers.

10. A changeable display comprising a sheet including a number of frames having a display on opposite sides of the same frame, said frames forming individual element of the display, a pair of take-up rollers on which the sheet is wound, said take-up rollers having parallel axes separated by the length of at least one of the frames, means for driving at least one of the take-up rollers, a housing in which the sheet, take-up rollers and driving means are located, said housing including a pair of panels on opposite sides of the sheet, each of said panels including a transparent window between the rollers and behind which the sheet is located so that opposite sides of the same frame can be simultaneously viewed from opposite sides of the housing, said windows lying parallel to and in close proximity with the sheet portion behind the windows so that light is not substantially reflected between the windows and the sheet portion, at least one of the panels being pivotable about an axis remote from the windows so that the window of at least one panel can be removed away from the sheet and access to the interior of the housing can be had, and bumper pad means on the interior of a portion of a panel in close proximity to the sheet, said bumper pad means being in contact with the sheet portion while the panels are closed.

11. The display of claim 10 wherein the housing includes light diffusing, translucent surfaces through which light from the lamp means propagates to illuminate the panels and which prevent images of the lamps from being seen outside of the housing.

12. The display of claim 11 wherein the transparent regions are centrally located relative to opposite faces of the housing so that a gap is formed between the transparent regions, said sheet passing through the gap between the take-up rollers, and wherein the surfaces are tapered inwardly toward the gap and away from each outside face of the housing.

13. The display of claim 10 further including lamp means inside of the housing for simultaneously illuminating the opposite sides of the frame that are located behind the transparent regions.

14. The display of claim 13 wherein the housing includes light diffusing, translucent surfaces through which light from the lamp means propagates to illuminate the panels and which prevent images of the lamps from being seen outside of the housing.

15. The display of claim 14 wherein the transparent regions are centrally located relative to opposite faces of the housing so that a gap is formed between the transparent regions, said sheet passing through the gap between the take-up rollers, and wherein the surfaces are tapered inwardly toward the gap and away from each outside face of the housing.

16. A changeable display in the form of multiple frames together forming a sheet, each frame including indicia to be simultaneously displayed on opposite sides of the display, comprising a pair of take-up rollers having parallel horizontal axes vertically separated from each other by the distance of at least one of the frames, the sheet extending between the rollers in a vertical plane between the axes, a single separate idler roller for each of said take-up rollers, each of said idler rollers having an axis parallel to the axis of its associated take-up roller so that a nip is formed between each idler roller and its associated take-up roller, said sheet being transferred between the take-up rollers so that the radius of the material wound on said take-up rollers is variable, the axes of the idler rollers being on opposite sides of said vertical plane so the sheet goes between one of the take-up rollers and its associated idler roller via a path extending away from the vertical plane in a first direction and the sheet goes between the other sheet take-up roller and its associated idler roller via a path extending away from the vertical plane in a second direction opposite from the first direction, means for driving at least one of the take-up rollers, a housing in which the sheet, take-up rollers and driving means are located, opposite sides of said housing having transparent regions behind which the sheet is located so that the opposite sides of the same frame can be simultaneously viewed from the opposite sides of the housing.

17. The display of claim 16 further including lamp means inside of the housing for simultaneously illuminating the opposite sides of the frame that are located behind the transparent regions.

18. The display of claim 17 wherein the housing includes light diffusing, translucent surfaces through which light from the lamp propagates to illuminate the panels and which prevent images of the lamps from being seen outside of the housing.

19. The display of claim 18 wherein the transparent regions are centrally located relative to opposite faces of the housing so that a gap is formed between the transparent regions, said sheet passing through the gap between the regions, and wherein the surfaces are tapered inwardly toward the gap and away from each outside face of the housing.

20. The display of claim 16 further including means for urging each of the idler rollers toward the periphery of the wound material on its associated take-up roller while the sheet is being transferred between the take-up rollers to maintain a nip having a constant separation between each idler roller and the adjacent periphery of the sheet wound on its associated take-up roller regardless of the radius of the material on the take-up rollers.

* * * * *